US008402245B2

(12) United States Patent
Kandasamy et al.

(10) Patent No.: US 8,402,245 B2
(45) Date of Patent: *Mar. 19, 2013

(54) SYSTEM AND COMPUTER PROGRAM PRODUCT FOR DYNAMICALLY RESIZING FILE SYSTEMS

(75) Inventors: Madhusudanan Kandasamy, Gobichettipalayam (IN); Pruthvi Panyam Nataraj, Bangalore (IN); Ranganathan Vidya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/353,424

(22) Filed: Jan. 19, 2012

(65) Prior Publication Data
US 2012/0124108 A1     May 17, 2012

Related U.S. Application Data

(63) Continuation of application No. 12/031,778, filed on Feb. 15, 2008, and a continuation of application No. 12/031,818, filed on Feb. 15, 2008, now Pat. No. 8,140,807.

(51) Int. Cl.
*G06F 12/00* (2006.01)
(52) U.S. Cl. ........ 711/170; 711/153; 711/173; 711/203; 707/822
(58) Field of Classification Search .................. None
See application file for complete search history.

(56) References Cited

U.S. PATENT DOCUMENTS

| | | | |
|---|---|---|---|
| 5,737,743 A | 4/1998 | Ooe et al. | |
| 6,640,233 B1 | 10/2003 | Lewis et al. | |
| 7,136,981 B2 | 11/2006 | Burch, Jr. et al. | |
| 2003/0084368 A1 | 5/2003 | Sprunt et al. | |
| 2003/0115218 A1 | 6/2003 | Bobbitt et al. | |
| 2006/0015473 A1* | 1/2006 | Swan | 707/1 |
| 2006/0235910 A1 | 10/2006 | Hur | |

OTHER PUBLICATIONS

Anonymous; Method for Improving Allocation of Computer Disk File Space Based on File Size Distribution; IBM Technical Disclosure Bulletin; vol. 27, No. 10B; Mar. 1985; pp. 6075-6079, USA.
Snyder, P.; tmpfs: a virtual memory file system; Proceedings of the Autumn; 1990 EUUG Conference, Oct. 22-26, 1990; pp. 241-248; Nice, France.
Otto, Alan; Non-Final Office Action; Sep. 30, 2010; U.S. Appl. No. 12/031,778.
Kandasamy, Madhusudanan; Response to Office Action; Dec. 20, 2010; U.S. Appl. No. 12/031,778; USPTO.
Otto, Alan; Final Office Action; Jul. 7, 2011; U.S. Appl. No. 12/031,778; USPTO.
USPTO; Prosecution history; downloaded Jan. 19, 2012; U.S. Appl. No. 12/031,818; USPTO.
Kandasamy, Madhusudanan; Appeal Brief; Dec. 6, 2011; U.S. Appl. No. 12/031,778; USPTO.

* cited by examiner

*Primary Examiner* — Christian P Chace
*Assistant Examiner* — Alan Otto
(74) *Attorney, Agent, or Firm* — David Mims; Robert C. Rolnok

(57) ABSTRACT

Methods (100), systems (300) and computer program products are disclosed for uninterrupted execution of an application program (110). The method (100) comprises: receiving a write operation call to a native file system from an application program (110) being executed on an operating system; and dynamically allocating (120, 122) free data blocks to the native file system from at least one other file system in a group of file systems until completion of execution of the application program (110) thereby completing the write operation call. The group of file systems is configured to allow sharing of free data blocks amongst the group of file systems.

1 Claim, 3 Drawing Sheets

SYSTEM AND COMPUTER PROGRAM PRODUCT FOR DYNAMICALLY RESIZING FILE SYSTEMS

CROSS-REFERENCE TO RELATED APPLICATIONS

The present application is a continuation of U.S. application Ser. No. 12/031,778, filed Feb. 15, 2008, entitled "Method for Dynamically Resizing File Systems" and U.S. application Ser. No. 12/031,818, filed Feb. 15, 2008, entitled "System and Computer Program Product for Dynamically Resizing File Systems," which are assigned to the assignee of the present invention and incorporated herein by reference in their entirety

TECHNICAL FIELD

The present invention relates generally to information technology and more particularly to file storage systems for computing devices.

BACKGROUND

In the various forms of the UNIX operating system, the number of disk blocks allocated in a file system is based on an initial configuration of file systems during creation of the file system. The sizes of the file systems remains unaltered until the file systems are removed and recreated for resizing, as required by a user. However, some file systems still provide a mechanism to increase the space by system administrators, and there are instances largely faced by system administrators or application developers, when an application exits or fails to continue execution due to a lack of file system space. An application running in the UNIX operating system may create temporary files on the native file system for data manipulation and when the application runs out of storage space on the native file system the application has no option but quit. Disadvantages include ramifications on system resource utilization and overhead for system administrators.

Some UNIX systems, for example AIX, allow the size of the file system to be increased without un-mounting the file system or rebooting the operating system. This does not let the applications increase the size of the file system for required usage of disk blocks while the applications are running Therefore, the applications running eventually fail execution due to a crash or exits due to lack of disk space when the file system becomes full. Only the root or the super-user can change the size of the file system, as needed, and the application must be re-run. If the file system gets full, only partial dumps are created on file systems, which is a disadvantage for application developers and kernel developers.

For example, in UNIX file systems, Ivar, Itmp, etc. are typically used to create temporary files. Running applications create files temporally on such file systems and delete the temporary files after completing application execution. Consider a scenario where each temporary file system has 0.5 GB of free disk space. If an application tries to create a 0.6 GB file, the application simply terminates due to insufficient disk space. Therefore, there exists a need for an improved method and system for dynamically resizing the filed systems without which the promise of this technology may never be fully achieved.

SUMMARY

In accordance with an aspect of the invention, there is provided a method for uninterrupted execution of an application program. The method comprises: receiving a write operation call to a native file system from an application program being executed on an operating system; and dynamically allocating free data blocks to the native file system from at least one other file system in a group of file systems until completion of execution of the application program thereby completing the write operation call, wherein the group of file systems is configured to allow sharing of free data blocks amongst the group of file systems.

The method may further comprise selecting a set of file systems as the group of file system. Still further, the method may comprise determining if the application program requires additional data blocks for continued execution.

The method may further comprise performing the write operation call to the native file system.

The method may further comprise providing a virtual file system (VFS) layer of the operating system as an interface for one or more application programs.

The method may further comprise borrowing free data blocks from at least one other file system in the group of file systems thereby increasing the size of the native file system.

Still further, the method may comprise reducing the size of the other file system from which the free data blocks are borrowed.

The method may further comprise configuring each file system in the group of file systems to limit the data blocks borrowed from each file system.

The native file system may be configured to borrow data blocks available from another file system within the group of file system thereby satisfying at least the requirements of completing the write operation call for the executing application program.

The method may comprise reducing the size of the native file system by releasing the borrowed data blocks in response to reduced usage of the native file system and increasing the size of the other file system in the group of file systems that yielded the borrowed data blocks, thereby resorting normalcy to the file system.

Disk space utilized across the group of file systems is constant.

The method may comprise checking if the native file system belongs to the group of file systems. The method may further comprise verifying the borrow status of the file system in the group of file systems. The method may comprise: checking if the data blocks borrowed from the other file systems in the group of file system is less than the maximum limit of data blocks that can be borrowed; and examining other free space details of the remaining file systems in the group of file system to determine if there is a file system to borrow from. The method may further comprise selecting the other file system, wherein the other file system comprises additional free data blocks more than required by the file system borrowing the data blocks.

The step of dynamically allocating may further comprise: reducing a size of storage space of the other file system in response to a file system specific call on the other file system; reducing a size of a logical volume of the other file system to match the reduced size of the other file system using a logical volume specific function called on a volume group; increasing the logical volume size of the native file system borrowing the free data blocks to utilize the free disk space freed by the logical volume of the other file system; and updating the status of both the native and other file systems.

In accordance with a further aspect of the invention, there is provided a system for uninterrupted execution of an application program. The system comprises: at least one storage device for storing data and computer program code to be carried out by a processing unit; a processing unit coupled to the at least one storage unit, the processing unit being programmed with the computer program code to implement steps of: receiving a write operation call to a native file system from an application program being executed on an operating system; and dynamically allocating free data blocks to the native file system from at least one other file system in a group of file systems until completion of execution of the application program thereby completing the write operation call, wherein the group of file systems is configured to allow sharing of free data blocks amongst the group of file systems.

The native file system and the at least one other file system in a group of file systems may be implemented using one or more storage devices coupled to the processing unit.

The native file system may be configured to borrow data blocks available from another file system within the group of file system thereby satisfying at least the requirements of completing the write operation call for the executing application program.

In accordance with still another aspect of the invention, there is provided a computer program product comprising a computer readable medium having recorded thereon a computer program for uninterrupted execution of an application program. The computer program comprises: a computer program code module for receiving a write operation call to a native file system from an application program being executed on an operating system; and a computer program code module for dynamically allocating free data blocks to the native file system from at least one other file system in a group of file systems until completion of execution of the application program thereby completing the write operation call, wherein the group of file systems is configured to allow sharing of free data blocks amongst the group of file systems.

BRIEF DESCRIPTION OF THE DRAWINGS

Embodiments of the invention are described hereinafter with reference to the drawings, in which.

DETAILED DESCRIPTION

Figure 1:
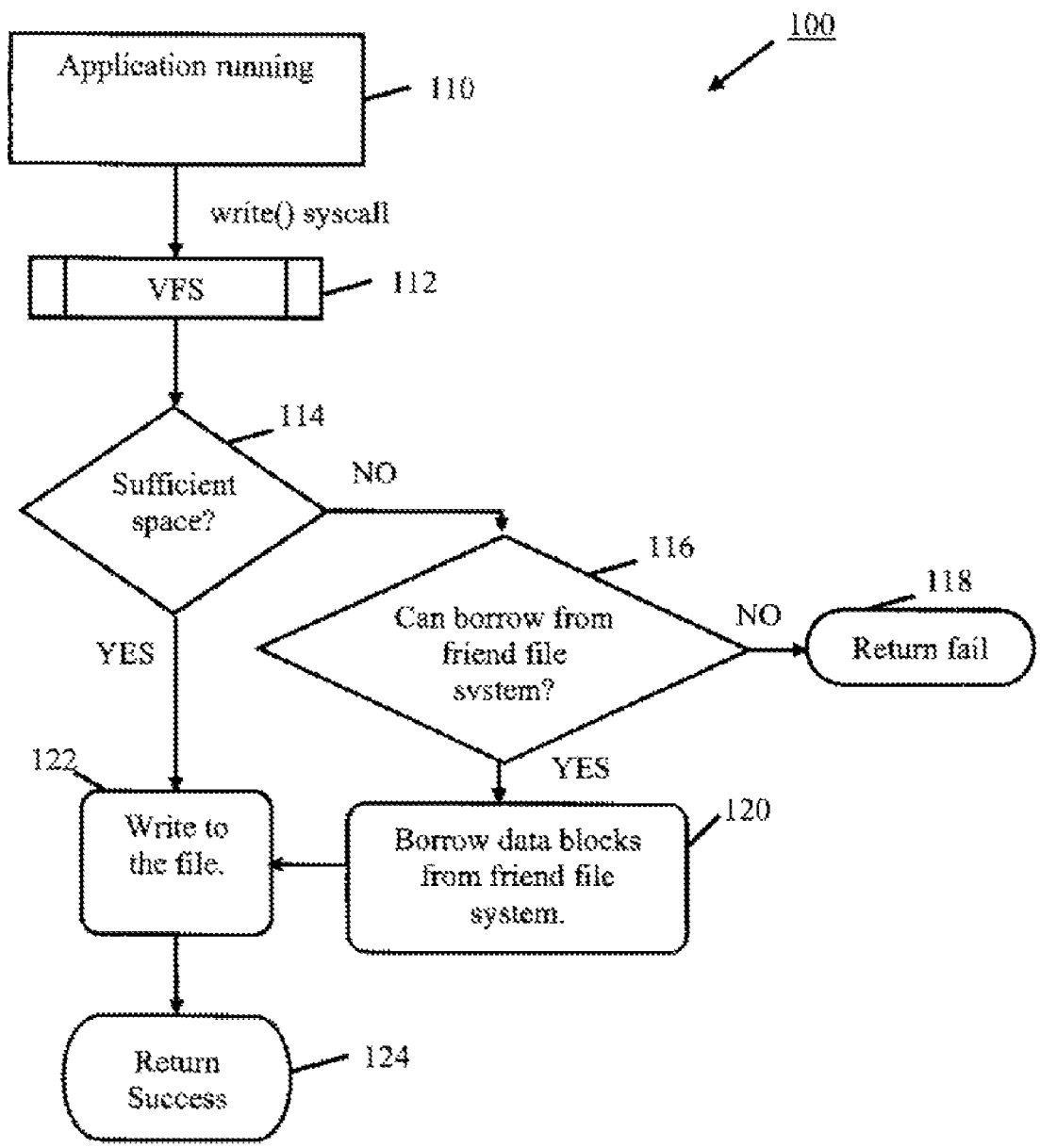
FIG. 1 is a flow diagram illustrating a method of resizing a native file system having insufficient storage space for storing a temporary file.

Methods, systems and computer program products are disclosed for uninterrupted execution of an application program. In the following description, numerous specific details, including particular operating systems, file sizes, and the like are set forth. However, from this disclosure, it will be apparent to those skilled in the art that modifications and/or substitutions may be made to the method, system and computer program product described herein without departing from the scope and spirit of the invention. In other circumstances, specific details may be omitted so as not to obscure the invention.

The explosion and complexity of information technology is outstripping people's ability to manage and maintain computer systems. This has stimulated research into autonomic computing, involving automating many functions associated with computing today, in a manner similar to the autonomic function of the human central nervous system. This involves smart computing components that provide what is needed when needed without any conscious mental or physical effort by users. Embodiments of the invention employ autonomic computing in respect of the better utilization of free storage space in multiple file systems, i.e., user friendly file systems that are self configuring and tunable.

In the embodiments of the invention, a set of file systems are formed as a group called a friend file system. A file system residing within the friend file system can borrow free data blocks from any other file system within the same group. Each file system in the friend file system can be configured to limit the number of data blocks a file system can borrow from another file system in the friend file system, as well as limit the number of data blocks that file system can yield to another file system in the friend file system. A file system that borrows data blocks from another file system in the friend file system fulfills the needs of any currently running applications by increasing the size of the borrowing file system. The same file system that borrowed the blocks returns those data blocks as soon as the file system usage gets reduced (e.g., the application deletes the temporarily created file) or at a pre-set interval determined by the user or the system. The file system can automatically grow and shrink on demand, but the total disk space utilization across all file systems in the friend file system should be kept constant. Thus, the embodiments of the invention utilize autonomic computing in relation to file systems within the friend file system involving the self configurability/tunability of a file system within the friend file system in response to the needs of an application program allocated data blocks within that group while running, and in which free data blocks are shared between file systems in the group. A friend file system is a member of a group of file systems from which free data blocks may be borrowed to resize the file system requiring them.

Embodiments of the invention allow file systems within the friend file system to borrow data blocks from one another by letting a native file system (e.g. one involving an application call) increase and regain its default size dynamically based on requirements of the running applications. A user configures the file systems, preferably the friend file system, in a configuration file that can be stored in a root file system. This configuration file can also contain information about the maximum number of data blocks a file system can borrow and/or the maximum number of data blocks the file system can yield to another file system in the friend file system. A Virtual File System (VFS) of an operating system (e.g., UNIX) reads the configuration file and loads the configuration file into memory during boot up of the operating system. In light of this disclosure, it should be apparent to one skilled in the art that any operating system that supports storing a configuration file, containing information about the maximum number of data blocks a filed system can borrow or be given, to perform dynamic resizing of file systems in which a native file system in a group of me systems can leverage other file systems inside the same group to utilize their data blocks temporarily should fall within the scope of this invention. For example, in one embodiment, all file systems located within the friend file system are preferably from the same volume group. The VFS also maintain details about current resizing status of each file system in the friend file system, including the number of data blocks that have been borrowed from or given to another file system of the friend file system.

FIG. 1 illustrates a method 100 of dynamically changing the size of file systems in a friend file system where a native file system requires increased size to permit file storage operations to be carried out by an application program. The additional storage required is borrowed from one or more other file systems in the friend file system. As shown in FIG.

1, an application program 110 makes a write system call (writer) syscall) to the VFS 112 for the native file system of the application program 110. If the write system call generated by the application program 110 fails in the native file system ('A'), a check is made in step 114 by the VFS to determine if there is sufficient free space (free data blocks) in the native file system 'A' to perform the operation. For the ease of description only, labels such as 'A' and 'B' are used to differentiate between the native file system ('A') in terms of a particular file system operation and another file system 'B' in the friend file system. If there is sufficient space (Yes) in the native file system 'A' to perform the operation, processing continues at step 122 and the file is written to the native file system 'A'. In step 124, the VFS returns that the write system call operation was successful. However, if decision step 114 returns false (No), processing continues at step 116.

If at step 114, there is insufficient space in the native file system 'A' to perform the operation, then in step 116, the VFS checks if the native file system 'A' in respect of the application program 110 can borrow space from the friend file system to continue uninterrupted execution of the application program. That is, a check is made to determine if the native file system 'A' belongs to a friend file system enabled for borrowing storage space, i.e. free data blocks, and if so, the borrow status of the file system is verified. If step 116 returns false (No), the VFS returns that the write system call operation has failed in step 118. In step 116, if the number of borrowed blocks from other file systems in the friend file system is less than the maximum limit of blocks that can be borrowed, all other free space details of the other file systems in the friend file system are examined to determine if there is a file system to borrow from. If one exists, a file system 'B' of the friend file system is selected if that file system 'B' has more free space than required by the native file system 'A' and if the file system 'B' has given blocks in this manner less than the maximum number (limit) of 'yield' blocks that file system 'B' is permitted to yield or lend to another file system in the friend file system. If the file system 'B' does not have sufficient space, data could be borrowed from more than one file system like 'B' and 'C', thereby catering to the requirement of 'A'. That is, step 116 returns true (Yes) and processing continues at step 120. Once there is sufficient space after borrowing space from a friend file system to perform the operation of the application program, processing continues at step 122 and the file is written to the native file system 'A'. In step 124, the VFS returns that the write system call operation was successful.

Figure 2:
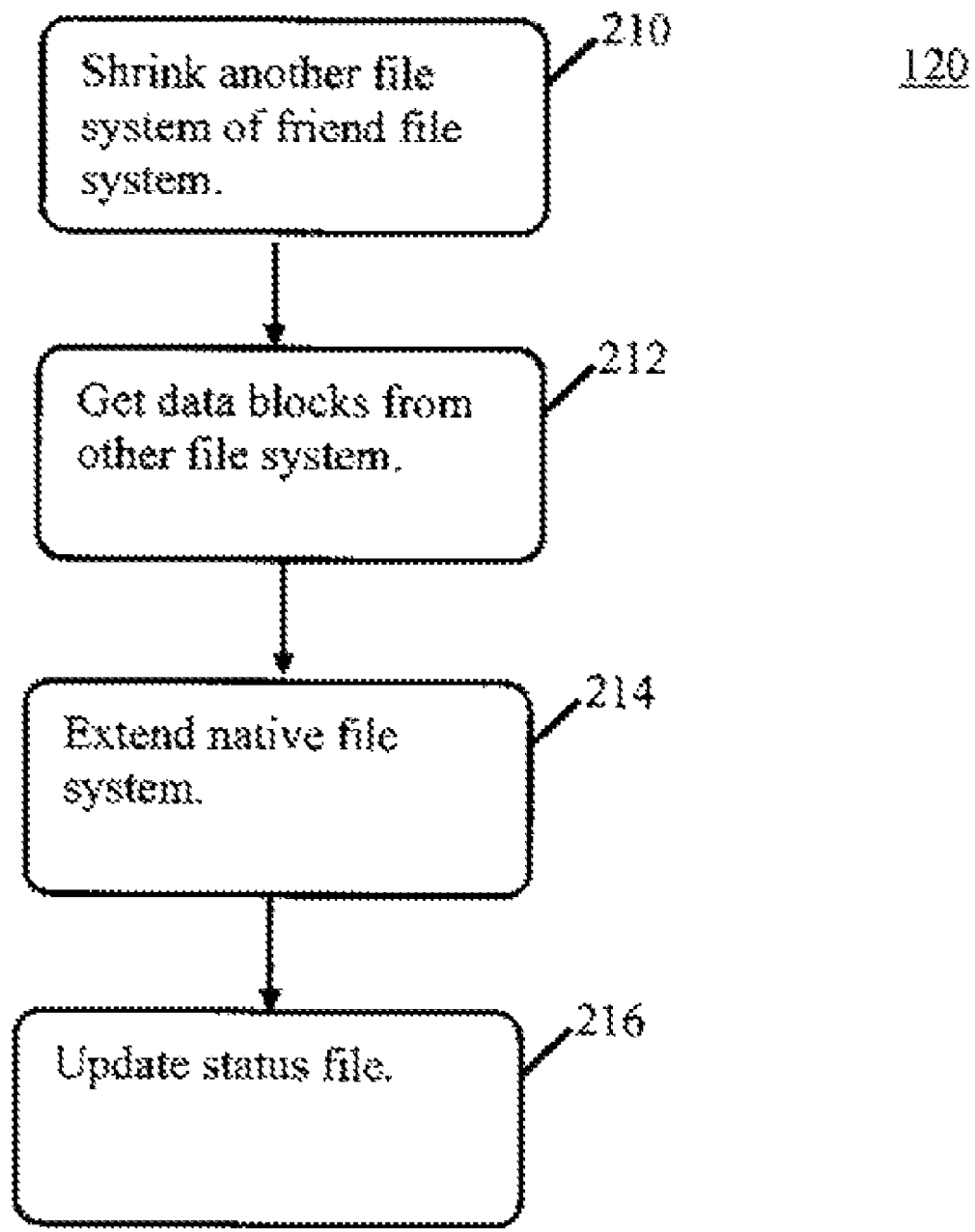
FIG. 2 is a flow diagram illustrating sub-steps of step 120 of FIG. 1.

In step 120, the native file system borrows data blocks from the friend file system to increase its size. As illustrated in FIG. 2, borrowing data blocks from a friend file system involves several sub-steps detailed in steps 21 OM216. In sub-step 210, another file system 'B' of the friend file system is shrunk. The VFS makes a file system specific call on the file system 'B' to shrink the size of storage space of that file system 'B'. A logical volume specific function is called on the volume group by the VFS to reduce the size of the logical volume of the file system 'B' of the friend file system to match the reduced file system size, thereby obtaining data blocks of the friend file system in sub-step 212.

In sub-step 214, the native file system 'A' is extended by the data blocks borrowed from the friend file system. The logical volume size of file system 'A' is increased to utilize the free disk space freed by the logical volume of the file system 'B'. In step 216, the status file of the friend file system is updated. That is, the status of both file systems is updated. The write instruction made to the file system 'A' is restarted in step 122. In this manner, the write system call to file system 'A' can be completed without a write error or failure, provided sufficient free data blocks are available elsewhere in the friend file system.

Figure 3:
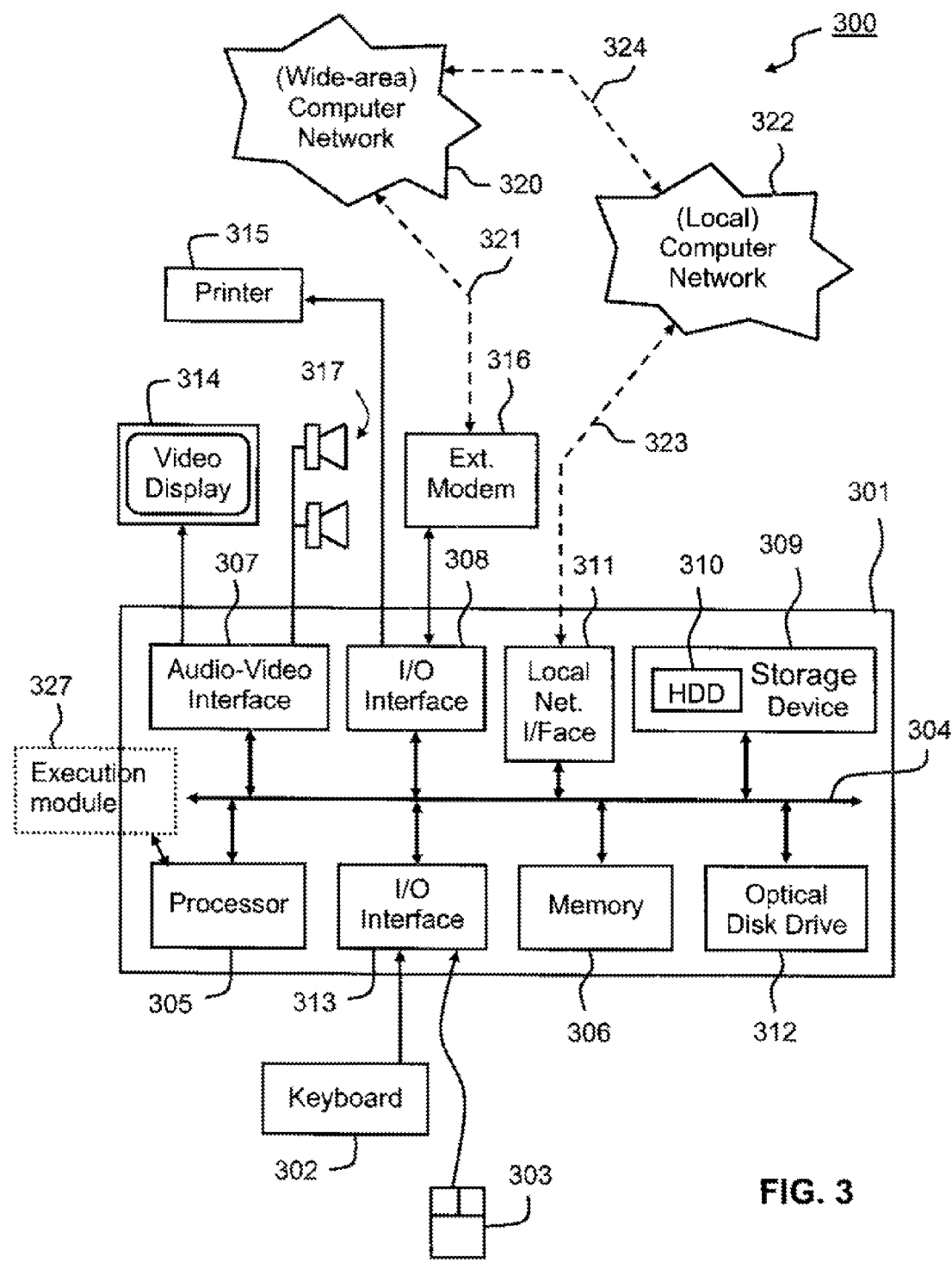
FIG. 3 is a block diagram of a general-purpose computing system with which embodiments of the invention may be practiced.

Embodiments of the invention described herein with reference to FIGS. 1 and 2 may be implemented using a computer system 300, such as that shown in FIG. 3. The processes of FIGS. 1 and 2 may be implemented as software executable within the computer system 300. In particular, steps of the methods shown in FIGS. 1 and 2 are effected by instructions in the software that are carried out within the computer system 300. The instructions may be formed as one or more code modules, each for performing one or more particular tasks. The software may also be divided into two separate parts, in which a first part and the corresponding code modules performs the methods for uninterrupted execution of an application program and a second part and the corresponding code modules manage a user interface between the first part and the user. The software may be stored in a computer readable medium, including the storage devices described hereinafter. The software is loaded into the computer system 300 from the computer readable medium and executed by the computer system 300. A computer readable medium having such software or computer program recorded on the computer readable medium is a computer program product. The use of the computer program product in the computer system 300 preferably effects an advantageous system for uninterrupted execution of an application program.

As shown in FIG. 3, the computer system 300 is formed by a computer module 301, input devices such as a keyboard 302 and a mouse pointer device 303, and output devices including a printer 315, a display device 314 and loudspeakers 317. An external Modulator-Demodulator (Modem) transceiver device 316 may be used by the computer module 301 for communicating to and from a communications network 320 via a connection 321. The network 320 may be a wide-area network (WAN), such as the Internet or a private WAN. Where the connection 321 is a telephone line, the modem 316 may be a traditional "dial-up" modem. Alternatively, where the connection 321 is a high capacity connection, the modem 316 may be a broadband modem. A wireless modem may also be used for wireless connection to the network 320.

The computer module 301 typically includes at least one processor unit 305, and a memory unit 306 for example formed from semiconductor random access memory (RAM) and read only memory (ROM). The module 301 also includes a number of input/output (I/O) interfaces including an audio-video interface 307 that couples to the video display 314 and loudspeakers 317, an I/O interface 313 for the keyboard 302 and mouse 303 and optionally a joystick (not illustrated), and an interface 308 for the external modem 316 and printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or similar functionality. The interface 311 may be formed by an Ethernet™ circuit card, a wireless Bluetooth™ or an IEEE 802.11 wireless arrangement.

The interfaces 308 and 313 may afford both serial and parallel connectivity, the former typically being implemented according to the Universal Serial Bus (USB) standards and having corresponding USB connectors (not illustrated). USB and Firewire are common interfaces used for connection to such a scanner as are other serial and parallel interfaces. Storage devices 309 are provided and typically include a hard disk drive (HDD) 310. Other devices such as a memory stick, a floppy disk drive and a magnetic tape drive (not illustrated) may also be used. An optical disk drive 312 is typically provided to act as a non-volatile source of data. Portable memory devices, such optical disks (e.g., CD-ROM, DVD), USB-RAM, and floppy disks for example may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations, Apple Mac™ or like computer systems evolved therefrom.

The computer system 300 consists of an execution module 327 coupled to the processor 305 and is configured to monitor the operating system calls. The execution module works in conjunction with the processor 305 and is configured to dynamically determine if the application program requires additional data blocks for continued execution and allocate free data blocks to a native file system from at least one other filed system in a group of file systems for performing uninterrupted execution of the application program. IN one embodiment, the execution module 327 maintains a record of the native system files system and data blocks allocated with each of the native files system. The execution module is further configured to maintain a record of the group of file systems and data blocks allocated to each of the group of file systems, and connects the native files system to the group of file systems by means of a relationship that is maintained in the execution module, for example a lookup table. When the execution module receives a write operation call to the native file system from the application program being executed on an operating system, and performs the write call operation to the native file system. The file system is selected from a group of file systems. The execution module provides a virtual file system (VFS) layer of the operating system as an interface for one or more application programs. The execution module is configured to borrow free data blocks from at least one other file system in the group of file system to increase size of the native file system. The execution module is configured to reduce size of the other file system from which data blocks are borrowed. The execution module is configured to maintain a constant disk space utilized across the group of file systems. The execution module is configured to perform a consistency check if the native file system belongs to the group of file systems. The execution module may be implemented as software or hardware as desired.

Typically, the software is resident on the hard disk drive 310 and read and controlled in execution by the processor 305. Intermediate storage of such programs and any data fetched from the networks 320 and 322 may be accomplished using the semiconductor memory 306, possibly in concert with the hard disk drive 310. In some instances, the software may be supplied to the user encoded on one or more CD-ROM and read via the corresponding drive 312, or alternatively may be read by the user from the networks 320 or 322. Still further, the software can also be loaded into the computer system 300 from other computer readable media. Computer readable media refers to any storage medium that participates in providing instructions and/or data to the computer system 300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned hereinbefore may be executed to implement one or more graphical user interfaces (GUIs) to be rendered or otherwise represented upon the display 314. Through manipulation of the keyboard 302 and the mouse 303, a user of the computer system 300 and the application may manipulate the interface to provide controlling commands and/or input to the applications associated with the GUI(s).

The method of FIGS. 1 and 2 may alternatively be implemented in dedicated hardware such as one or more integrated circuits performing the functions or sub functions of uninterrupted execution of an application program. Such dedicated hardware may include graphic processors, digital signal processors, or one or more microprocessors and associated memories.

If a file is deleted in a file system (e.g. file system 'A') of the group and if that file system (e.g. 'A') borrowed some blocks from another file system of the friend file system, the VFS performs complementary, but similar steps as given hereinbefore to reduce the size of the native file system (e.g. 'A') to or towards the original file system size, dependent upon the number of free data blocks borrowed from other file systems in the group.

In the foregoing manner, embodiments of the invention enable the dynamic resizing of the file systems, in which a native file system in a group of file systems can leverage other file systems inside the same group to utilize their data blocks temporarily. A file system can thereby temporarily increase its size based on the needs of an application and native file system to release the data blocks to its friend after use, thereby allowing other file system to borrow blocks whenever needed.

Space requirements of files opened by one or more applications on any file systems, and not by any file server, are managed so that the free data blocks between groups of tile systems are shared. Reservation of file space is not initiated by any file service. If a file operated by the application runs out of space on the native file system in which a write operation of data fails on the native file system for the file needed by the application under execution, the write system call works with the friend file system to verify if free data blocks can be borrowed. The VFS computes, based on configuration of the group of file systems, the number of free data blocks that can be lent to the native file system from the other file system of the friend file system that the blocks are borrowed from. That is, data blocks are not reserved beforehand for a file. The expansion (and contraction) of the native file system occurs on a need basis for the request initiated by the executing application if a write operation from an application cannot be completed on the native file system and if sufficient free blocks can be used from another file system in the group. The data blocks from the lending file system are reduced and offered to the borrowing native file system based on predefined values set using VFS parameters.

In the embodiments of the invention, a file system in a group of file systems leverages all other file systems within the same group to utilize their data blocks temporarily. A file system within a group can temporarily increase its size based on the needs of an application program using the file system. In this manner, an application program is able normally to continue execution without a crash occurring due to lack of space in the native file system accessed by the application program. The embodiments of the invention allow an application program to consume additional disk space temporarily from the friend file system. Thus, the embodiments of the invention enable dynamic resizing of file systems within a group by borrowing data blocks from one or more file systems. The native file system accessed by the application can release the data blocks to a file system(s) of the friend file system after use, allowing another file system to borrow blocks when needed. The embodiments of the invention thereby increase the effective usage of disk space across file systems within a group of file systems.

The embodiments of the invention are applicable to the information technology and file storage system industries, amongst others. The foregoing describes only some embodiments of the present invention, and modifications and/or changes can be made thereto without departing from the scope and spirit of the invention, the embodiments being illustrative and not restrictive.

We claim:

1. A computer system comprising at least a memory and a processor, the processor coupled to an execution module configured to:

monitor execution of an application program on the computer system;

dynamically determine if the application program requires additional data blocks for continued execution;

allocate free data blocks to a native file system from at least one other file system in a group of file systems for performing uninterrupted execution of the application program, wherein the at least one other file system is selected from the group of file systems;

reduce a size of storage space of the at least one other file system in response to a file system specific call on the at least one other file system;

reduce a size of a logical volume of the at least one other file system to match a reduced size of the at least one other file system using a logical volume specific function called on a volume group;

increase a logical volume size of the native file system borrowing said free data blocks to utilize free disk space freed by the logical volume of the at least one other file system; and update a status of the native file system and a status of the at least one other file system.

* * * * *